(12) United States Patent
Burger et al.

(10) Patent No.: US 8,386,467 B2
(45) Date of Patent: Feb. 26, 2013

(54) CONTROLLING OPTIMIZER ROBUSTNESS AND ACHIEVING SERVICE LEVEL GOALS IN A DATABASE SYSTEM

(75) Inventors: Louis Burger, Escondido, CA (US); Thomas Julien, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 602 days.

(21) Appl. No.: 12/534,913

(22) Filed: Aug. 4, 2009

(65) Prior Publication Data

US 2011/0010361 A1    Jan. 13, 2011

Related U.S. Application Data

(63) Continuation-in-part of application No. 12/498,391, filed on Jul. 7, 2009.

(51) Int. Cl.
*G06F 7/00* (2006.01)
*G06F 17/30* (2006.01)

(52) U.S. Cl. .................. 707/713; 707/718; 707/719

(58) Field of Classification Search .............. 707/713, 707/718, 719, 720
See application file for complete search history.

(56) References Cited

U.S. PATENT DOCUMENTS

| | | | |
|---|---|---|---|
| 5,301,317 A * | 4/1994 | Lohman et al. | 1/1 |
| 6,529,901 B1 * | 3/2003 | Chaudhuri et al. | 1/1 |
| 6,917,932 B2 * | 7/2005 | Chang et al. | 707/718 |
| 7,007,009 B2 * | 2/2006 | Bestgen et al. | 1/1 |
| 7,636,707 B2 * | 12/2009 | Chaudhuri et al. | 1/1 |
| 7,693,820 B2 * | 4/2010 | Larson et al. | 707/999.002 |
| 7,716,215 B2 * | 5/2010 | Lohman et al. | 707/721 |
| 7,853,584 B2 * | 12/2010 | Barsness et al. | 707/719 |
| 2006/0136396 A1 * | 6/2006 | Brobst | 707/3 |
| 2010/0145929 A1 * | 6/2010 | Burger et al. | 707/713 |

OTHER PUBLICATIONS

Brian Babcock and Surajit Chaudhuri (2005), "Towards a Robust Query Optimizer: A Principled and Practical Approach", pp. 119-130.*

* cited by examiner

*Primary Examiner* — Merilyn Nguyen
(74) *Attorney, Agent, or Firm* — Steve McDonald; Ramin Mahboubian

(57) ABSTRACT

A system, method, and computer-readable medium for automatic and dynamic control of optimizer settings in a large complex system environment are provided. The described mechanisms significantly increase the potential of achieving Service Level Goals for classes of queries where optimizer aggression is needed. Confidence threshold parameters are automatically controlled to facilitate generation of query execution plans to conform with associated Service Level Goals.

12 Claims, 4 Drawing Sheets

CONTROLLING OPTIMIZER ROBUSTNESS AND ACHIEVING SERVICE LEVEL GOALS IN A DATABASE SYSTEM

CROSS-REFERENCE TO RELATED APPLICATION

This application is a continuation-in part of U.S. patent application Ser. No. 12/498,391 titled "SYSTEM, METHOD, AND COMPUTER-READABLE MEDIUM FOR ENHANCING QUERY EXECUTION BY AN OPTIMIZER IN A DATABASE SYSTEM," filed on Jul. 7, 2009 by Louis M. Burger, which is hereby incorporated by reference.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, CPU processing, I/O processing, network processing, etc., as determined by an optimizer. The response time is the amount of time it takes to complete the execution of a query on a given system. In this context, a "workload" is a set of requests, which may include queries or utilities, such as loads, that have some common characteristic(s), such as application, source of request, type of query, priority, response time goals, etc.

Contemporary research involves improving the "robustness" of a query optimizer, where robustness is characterized by query execution plans whose performance are predictable and consistent. From the standpoint of system management, the predictability of query plan performance is very important. When the actual cost of a query plan deviates significantly from the optimizer's estimate, it becomes more difficult to tune and manage the performance of a large system.

Although query robustness is a desirable goal, there is often a tradeoff between query robustness and the goal of achieving the best possible query performance. Optimizers frequently have a choice between a conservative query execution plan that will perform reasonably well in most situations, and an aggressive plan that performs very well if the cost estimates and runtime assumptions are accurate. However, if the cost estimates and runtime assumptions are not accurate, the performance of processing an aggressive plan may be significantly degraded. The decision of whether to pursue an aggressive strategy is strongly influenced by a "confidence" parameter that the optimizer assigns to its estimates which, in turn, are based on various factors, such as the presence of statistics. Such confidence parameters are typically included in the plan information made available to system management tools which may alter rule enforcement logic in view of the confidence parameters. For example, an optimizer's upper bound costs may be used in place of lower bound costs when the associated confidence level is below a particular level.

Although it is useful to factor in the optimizer's assigned confidence levels when regulating workload performance, contemporary approaches are inherently passive and reactive with regards to controlling the desired level of optimizer aggressiveness. As noted above, there is often a tradeoff between predictability and performance, and it would be desirable to set the appropriate balance between the two competing goals by accounting for specific requirements of the individual application or workload. However, contemporary mechanisms do not account for the specific requirements of the individual SQL request or workload when deciding a level of optimizer aggressiveness. In particular, a Service Level Goal (SLG) may be defined for a particular query or workload, e.g., a group of queries, that specifies a desired performance characteristic for the query or workload. For instance, an SLG may specify a desired maximum processing duration of a query. SLGs are typically used by automated workload management systems in deciding how to assign and regulate critical system resources, such as central processing unit (CPU) allocations for processing of the query. Existing automated actions that take into account SLGs are usually limited to the scheduling of resources during the execution of a query and do not influence the query optimization process.

Disadvantageously, no mechanisms are currently available that provide for proactively controlling an optimizer's pursuit of robustness for individual workloads or queries in a manner that accounts for a query or workload SLG.

SUMMARY

Disclosed embodiments provide a system, method, and computer readable medium for automatic and dynamic control of optimizer settings in a large complex system environment. The described mechanisms significantly increase the potential of achieving Service Level Goals for certain classes of queries where optimizer aggression is needed. A confidence threshold parameter is automatically controlled where manual user control is generally unfeasible. Optimizer technologies in the area of robustness are advantageously exploited.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

No mechanisms are currently available that provide for proactively controlling an optimizer's pursuit of robustness for individual workloads or queries by mechanisms integrated with an automated management system that account for a query or workload SLG. In accordance with disclosed embodiments, mechanisms are provided that facilitate proactively controlling an optimizer such that a given query plan has the appropriate blend of robustness and potential speed to meet its SLG.

Figure 1:
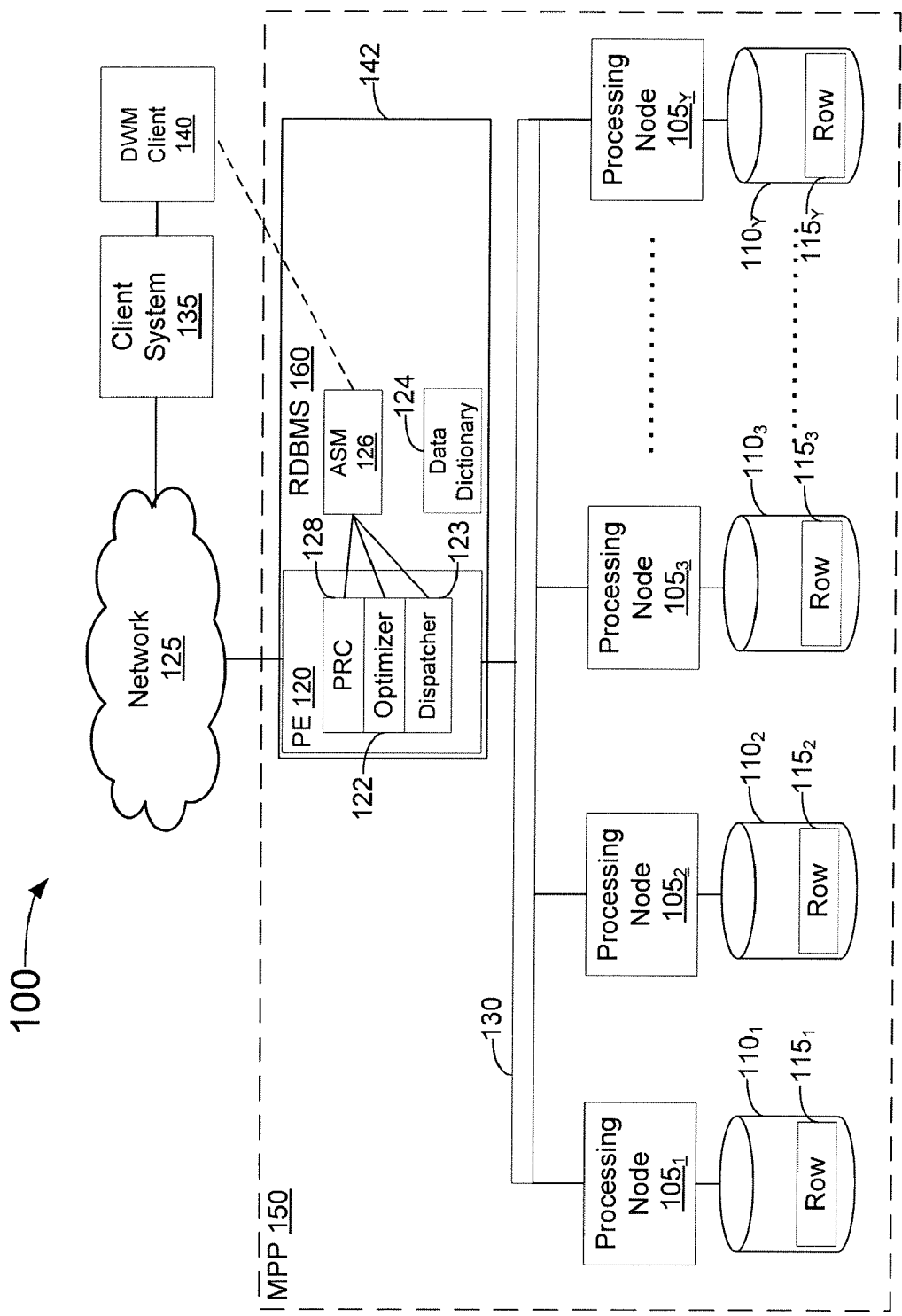
FIG. 1 depicts a diagrammatic representation of an exemplary architecture for a large database system that is suited for implementing mechanisms that facilitate control of generation of an optimizer's execution plan for a query in accordance with disclosed embodiments.

FIG. 1 depicts a diagrammatic representation of an exemplary architecture for a large database system 100, such as a Teradata Active Data Warehousing System, that is suited for implementing mechanisms that control an optimizer's pursuit of robustness in accordance with disclosed embodiments.

The database system 100 includes a relational database management system (RDBMS) 160 built upon a massively parallel processing (MPP) system 150. As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Y}$ among the processing nodes $105_{1 \ldots Y}$ and accesses processing nodes $105_{1 \ldots Y}$ via an interconnect 130. The parsing engine 120 also coordinates the retrieval of data from the data-storage facilities $110_{1 \ldots Y}$ in response to queries received from a user, such as one at a client computer system 135 connected to the database system 100 through a network 125 connection. The client computer system 135 may run a dynamic workload manager (DWM) client 140. The parsing engine 120, on receiving an incoming database query, may invoked a plan robustness controller (PRC) 128 that interfaces with an optimizer 122 and an active system management (ASM) 126 module. The PRC 128 is responsible for setting a confidence threshold parameter prior to invoking the optimizer 122 and potentially repeating this process until the desired blend of robustness and speed are achieved relative to a query's SLG. Users may define SLGs through system management tools, e.g., via DWM client 140 and/or ASM 126, and, in turn, these SLGs are made available to the PRC 128. The PRC may then invoke the optimizer 122 component to assess the best plan for execution of the query. Selecting the optimal query-execution plan includes, among other things, identifying which of the processing nodes $105_{1 \ldots Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

The ASM 126 may be implemented as a "closed-loop" system management (CLSM) architecture capable of satisfying a set of workload-specific goals. In other words, the system is a goal-oriented workload management system capable of supporting complex workloads and capable of self-adjusting to various types of workloads. The ASM 126 is communicatively interfaced with the PRC 128 and is adapted to convey a query, or workload, SLG to the PRC. The PRC 128 is communicatively interfaced with the optimizer 122 and is adapted to convey a confidence threshold parameter, T, (described more fully hereinbelow) and associated parameters to the optimizer 122. The ASM 126 is communicatively interfaced with a dispatcher 123 to receive query execution plan costs therefrom. The DWM client 140 is communicatively interfaced with the ASM 126.

The ASM 126 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance.

Figure 2:
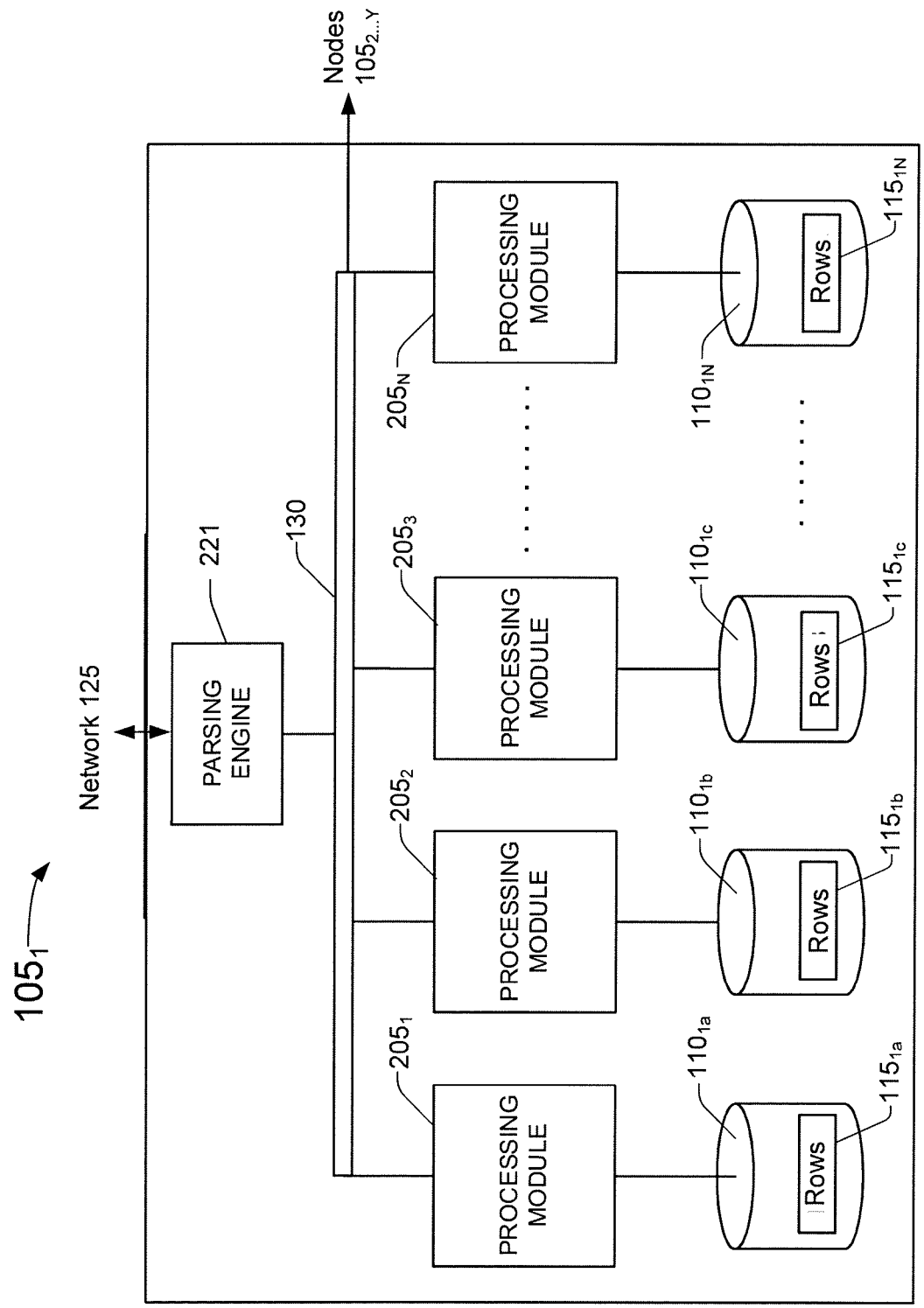
FIG. 2 depicts a diagrammatic representation of a sample architecture for one node of the database system depicted in FIG. 1.

FIG. 2 depicts a diagrammatic representation of a sample architecture for one node $105_1$ of the DBS 100. The DBS node $105_1$ includes one or more processing modules $205_{1 \ldots N}$, e.g., AMPs, connected by an interconnect 130 that manage the storage and retrieval of data in data-storage facilities $110_{1a \ldots 1N}$. The processing module $205_{1 \ldots N}$ and the dispatcher 123 depicted in FIG. 1 are collectively referred to herein as a runtime query execution system. Each of the processing modules $205_{1 \ldots N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1 \ldots N}$ manages a portion of a database that is stored in a corresponding one of the data-storage facilities $110_{1a \ldots 1N}$. Each of the data-storage facilities $110_{1a \ldots 1N}$ includes one or more disk drives. The DBS may include multiple nodes $105_{2 \ldots Y}$ in addition to the illustrated node $105_1$, connected by way of the interconnect 130.

The system stores data in one or more tables in the data-storage facilities $110_{1a \ldots 1N}$. The rows $115_{1a \ldots 1N}$ of the tables are stored across multiple data-storage facilities $110_{1a \ldots 1N}$ to ensure that the system workload is distributed evenly across the processing modules $205_{1 \ldots N}$. A parsing engine 221 organizes the storage of data and the distribution of table rows $110_{1a \ldots 1N}$ among the processing modules $205_{1 \ldots N}$. The parsing engine 221 also coordinates the retrieval of data from the data-storage facilities $110_{1a...1N}$ in response to queries received from a user at a client computer system $135_{1...N}$. The DBS 100 usually receives queries and commands to build tables in a standard format, such as SQL.

In one implementation, the rows $115_{1a...1N}$ are distributed across the data-storage facilities $110_{1a...1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a...1N}$ and associated processing modules $205_{1...N}$ by a hash bucket map. The characteristics of the columns chosen for the primary index determine how evenly the rows are distributed.

Figure 3:
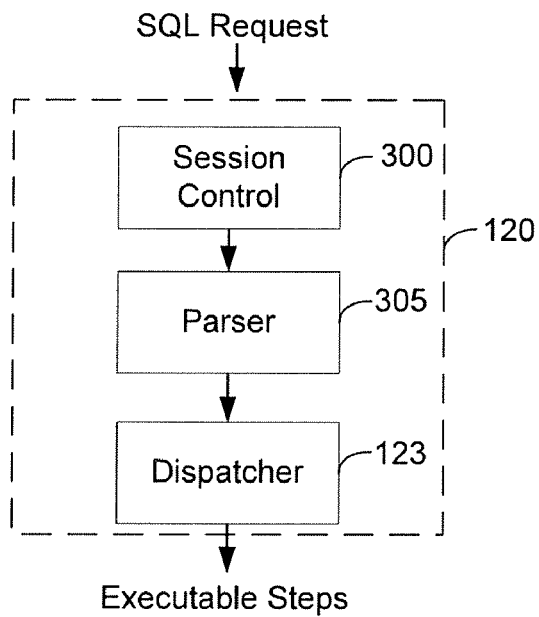
FIG. 3 is a diagrammatic representation of a parsing engine implemented in accordance with an embodiment.
Figure 4:
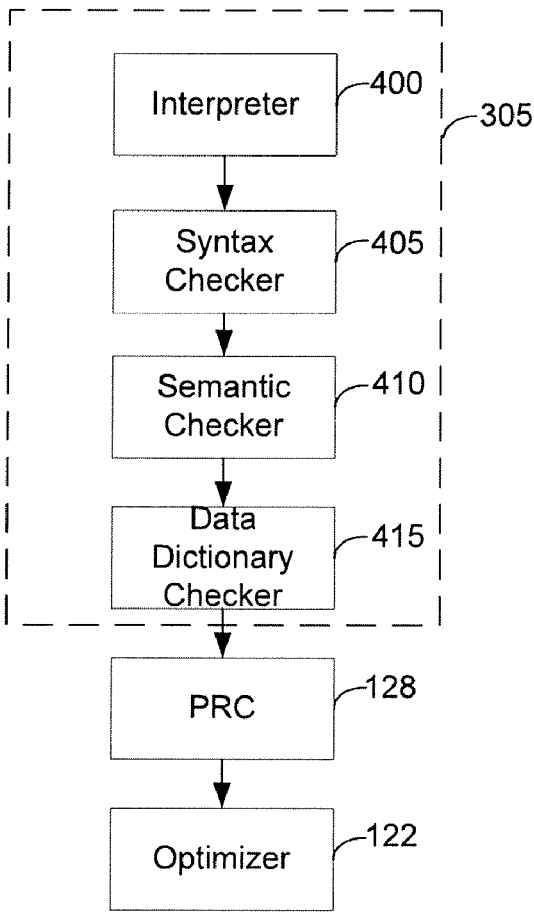
FIG. 4 is a diagrammatic representation of a parser implemented in accordance with an embodiment.

In one example system, a parsing engine, such as the parsing engine 120, is made up of three components: a session control 300, a parser 305, and a dispatcher 123 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 invokes the PRC 128 that sets a confidence threshold parameter that, in turn, invokes the optimizer 122 that selects the least expensive plan to perform the request, and a dispatcher 123 coordinates the runtime execution of executable steps of the optimizer's 122 query execution plan with the processing modules $205_1$-$205_N$.

In accordance with disclosed embodiments, optimizer predictability, i.e., actual query execution costs are close to estimated costs, and consistency, i.e., similar queries have similar performance, can be controlled by applying probability mechanisms to cardinality estimation. Further, an optimizer parameter can be used to control the desired level of predictability and consistency and the resulting tradeoff with potential performance. Still further, the optimizer parameter may be adjusted by the PRC 128 in accordance with an SLG assigned or otherwise associated with a query. The optimizer mechanism is further enhanced by allowing setting and adjustment of an optimizer parameter in the context of automated system management.

In an embodiment, an optimizer parameter comprising a "Confidence Threshold Parameter" may have a value that is set as a system wide setting. Additionally, the confidence threshold parameter may have a value that is set on a per query and/or per workload basis. Further, the confidence threshold parameter may be implemented as a session level parameter, e.g., per user database system session. Still further, disclosed mechanisms facilitate modification of a confidence threshold parameter based on a query or workload SLG.

A confidence threshold parameter of T % supplied to the optimizer specifies a quantification of the desired confidence that query execution costs will not exceed estimated costs. In this manner, the confidence threshold parameter causes the optimizer to estimate costs such that it is T % confident that the actual query execution cost will not exceed the query execution estimated cost. Hence, increasing the confidence threshold parameter causes the optimizer to utilize a more conservative query execution plan, and decreasing the confidence threshold parameter results in the optimizer utilizing a more aggressive query execution plan. For example, setting the confidence threshold parameter at 80% may be utilized for general purpose processing, and a confidence threshold parameter value of 95% may be utilized to achieve very stable plans.

In an embodiment, upon receipt of a query by the PE 120, the PRC 128 receives an SLG assigned to the query. The PRC then sets a confidence threshold parameter value for the query. The optimizer is then supplied with the query and the confidence threshold parameter value assigned or otherwise associated therewith. The optimizer then generates a query execution plan according to the confidence threshold parameter value and in the process calculates an estimated cost for processing of the query execution plan. The optimizer then supplies the estimated cost to the PRC which compares the estimated cost with the SLG of the query. If the estimated cost is less than or equal to the SLG, the optimizer is allowed to continue processing of the query according to the query execution plan. Alternatively, if the estimated cost exceeds the SLG, the PRC 128 lowers there confidence threshold parameter value and supplies the lowered value to the optimizer for generation of another, more aggressive, execution plan in an attempt to obtain a query execution plan compliant with the query SLG. The PRC 128 may iteratively repeat this process until the desired blend of robustness and speed are achieved relative to the query's SLG. In this manner, the confidence threshold parameter is set to a value such that the particular query plan chosen for execution of the query is expected to conform to the query SLG.

The PRC 128 may initially invoke the optimizer with a relatively high confidence threshold parameter. If the resulting query plan cost is less than the SLG, the PRC 128 may exit and query processing may continue. To this end, the optimizer's plan cost may generally correlate to an SLG to facilitate comparison of the two. In the event that the plan cost is greater than the SLG, the confidence threshold parameter may be lowered by the PRC, and the optimizer is again called and supplied with the modified confidence threshold parameter. This process may repeat until the SLG is met or, alternatively, until a confidence threshold parameter value is reached that is so low that further aggression is either pointless or reckless.

Figure 5:
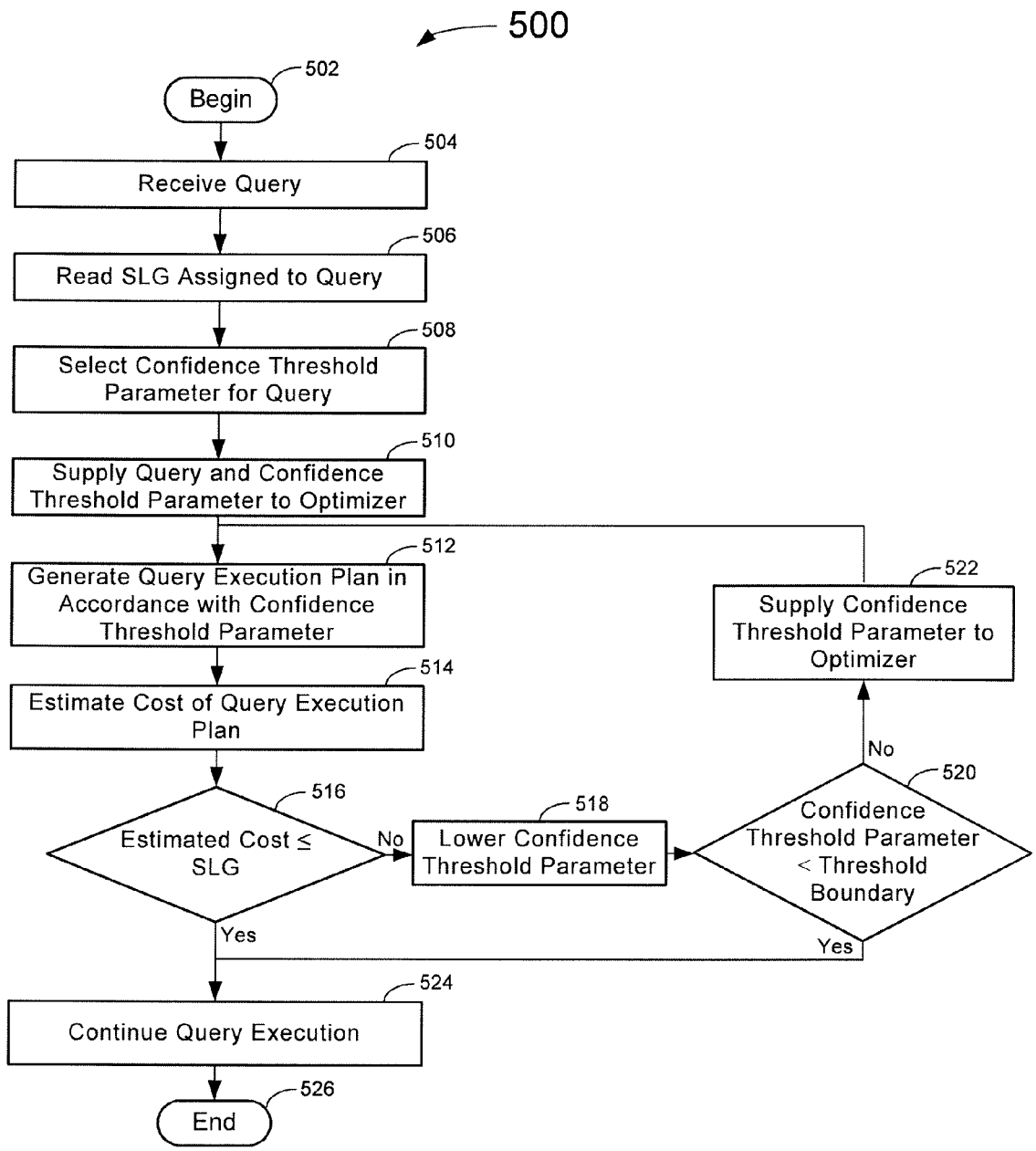
FIG. 5 if a flowchart of an optimizer parameter specification routine implemented in accordance with disclosed embodiments.

FIG. 5 is a flowchart 500 of an optimizer parameter specification routine implemented in accordance with disclosed embodiments. The processing steps of FIG. 5 may be implemented as computer-executable instructions tangibly embodied on a computer-readable medium executable by a processing system, such as one or more of the processing nodes $105_1$-$105_Y$ depicted in FIG. 1.

The routine is invoked (step 502), and a query to be processed is received (step 504), e.g., by the PE 120. An SLG assigned to the query is then read (step 506), e.g., by the PRC 128. For instance, the SLG may be received with the query or, alternatively, may be provided to the PRC 128 by the ASM 126. The PRC 128 then selects a confidence threshold parameter for the query (step 508). On the initial setting of the confidence threshold parameter, the PRC 128 may set the confidence threshold parameter to a relatively high value, e.g., a confidence threshold parameter value of 95 percent. The PRC 128 then supplies the optimizer 122 with the query and the confidence threshold parameter value (step 510). The optimizer 122 then generates a query execution plan in accordance with the confidence threshold parameter (step 512). As discussed above, the optimizer 122 generates a more conservative query execution plan for higher confidence threshold parameters, and generates more aggressive query execution plans for lower confidence threshold parameters. Upon generation of the query execution plan, the optimizer may calculate an estimated query execution cost for the generated query execution plan (step 514). The optimizer 122 may then supply the estimated query execution cost to the PRC 128 which then compares the estimated query execution cost with the SLG of the query to determine if the estimated cost is less than or equal to the SLG (step 516). If the estimated cost is not less than or equal to the SLG, the confidence threshold parameter value is lowered (step 518). For instance, the confidence threshold parameter value may be reduced by ten percent. An evaluation may then be made to determine if the confidence threshold parameter value is less than a threshold boundary (step 520). For example, the threshold boundary may be assigned a value of fifty percent. Further, the threshold boundary value may be assigned on a per query basis, to workload, or may comprise a system wide setting. In the event that the confidence threshold parameter value is not less than the threshold boundary, the modified confidence threshold parameter value may then be supplied to the optimizer 122 (step 522), and another query execution plan may be generated in accordance with the modified confidence threshold parameter value according to step 512. In the event it is determined at step 520 that the confidence threshold parameter value is less than the threshold boundary, the optimizer 122 may then be notified to continue execution of the query (step 524).

Returning again to step 516, in the event that the estimated cost for execution of the query is determined to be less than or equal to the SLG of the query, the optimizer 122 may be notified to continue execution of the query according to step 524. The optimizer parameter specification routine cycle may then end (step 526). In this manner, the estimated cost of the query execution plan selected for execution is compliant with the SLG assigned to the query.

As described, the disclosed mechanisms advantageously provide automatic and dynamic control of optimizer settings in a large complex system environment. The described mechanisms significantly increase the potential of achieving Service Level Goals for certain classes of queries where optimizer aggression is needed. The confidence threshold parameter is automatically controlled where manual user control is generally unfeasible. Further, recent advancements in optimizer technologies in the area of robustness are advantageously exploited. The processing logic performed by the routine described above with reference to FIG. 5 is based on the observation that aggressive optimizer plan selection should generally be limited to those cases where it is necessary to have any reasonable hope of meeting a query's SLG. The pursuit of SLG achievement via aggressive plans is worth the risk with the risk being even worse plan performance in certain, but limited, cases. In all other cases, the described mechanisms advantageously provide a relatively high level of robustness in order to achieve confidence and predictability in plan performance. Without an SLG, a system has no concrete basis on which to decide when optimizer aggression is warranted.

The flowchart of FIG. 5 depicts process serialization to facilitate an understanding of disclosed embodiments and is not necessarily indicative of the serialization of the operations being performed. In various embodiments, the processing steps described in FIG. 5 may be performed in varying order, and one or more depicted steps may be performed in parallel with other steps. Additionally, execution of some processing steps of FIG. 5 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of controlling the robustness level of a query optimizer to facilitate compliance with service level goals and performance predictability in a database system, comprising:
receiving, by the database system, a query to be executed;
receiving a service level goal associated with the query that specifies a desired processing performance characteristic to be achieved by execution of the query;
assigning a confidence threshold parameter having a first value that specifies an optimizer confidence level that execution of a generated query plan for the query will incur a processing cost that will not exceed an estimated processing cost;
generating a first query plan in accordance with the confidence threshold parameter;

calculating an estimated processing cost of the first query plan that specifies an estimated processing performance characteristic for execution of the first query plan;

determining whether the estimated processing cost is less than or equal to the service level goal;

lowering the confidence threshold parameter to a second value when the determining determines that the estimated processing cost is not less than or equal to the service level goal;

determining whether the second value of the confidence threshold parameter is less than a threshold boundary value; and generating a second query plan in accordance with the second value of the confidence threshold parameter when the determining determines that the second value is not less than the threshold boundary value.

2. The method of claim 1, wherein determining whether the estimated processing cost is less than or equal to the service level goal comprises determining the estimated processing cost is less than or equal to the service level goal, the method further comprising executing the first query plan.

3. The method of claim 1, wherein determining whether the second value of the confidence threshold parameter is less than a threshold boundary value comprises determining the second value is less than the threshold boundary value, the method further comprising executing the first query plan.

4. The method of claim 1, wherein the service level goal specifies a desired maximum processing duration of the query.

5. A non-transient computer-readable medium storing at least computer-executable instructions for execution by a processing system, the computer-executable instructions for controlling the robustness level of a query optimizer to facilitate compliance with service level goals and performance predictability in a database system, wherein the computer-executable instructions, when executed, cause the processing system to:

receive, by the database system, a query to be executed;

receive a service level goal associated with the query that specifies a desired processing performance characteristic to be achieved by execution of the query;

assign a confidence threshold parameter having a first value that specifies an optimizer confidence level that execution of a generated query plan for the query will incur a processing cost that will not exceed an estimated processing cost;

generate a first query plan in accordance with the confidence threshold parameter;

calculate an estimated processing cost of the first query plan that specifies an estimated processing performance characteristic for execution of the first query plan;

determine whether the estimated processing cost is less than or equal to the service level goal; and lower the confidence threshold parameter to a second value when the determining determines that the estimated processing cost is not less than or equal to the service level goal;

determine whether the second value of the confidence threshold parameter is less than a threshold boundary value; and generate a second query plan in accordance with the second value of the confidence threshold parameter when the determining determines that the second value is not less than the threshold boundary value.

6. The non-transient computer-readable medium of claim 5, wherein the instructions that determine whether the estimated processing cost is less than or equal to the service level goal determine that the estimated processing cost is less than or equal to the service level goal, the computer-readable medium further comprising computer-executable instructions that, when executed, cause the processing system to execute the first query plan.

7. The non-transient computer-readable medium of claim 5, wherein the instructions that determine whether the second value of the confidence threshold parameter is less than a threshold boundary value determine that the second value is less than the threshold boundary value, the computer-readable medium further comprising computer-executable instructions that, when executed, cause the processing system to execute the first query plan.

8. The non-transient computer-readable medium of claim 5, wherein the service level goal specifies a desired maximum processing duration of the query.

9. A computer system that includes:

a memory;

at least one processor coupled to the memory, the at least one processor configured to:

receive a query and a service level goal associated with the query that specifies a desired processing performance characteristic to be achieved by execution of the query, assign a confidence threshold parameter having a first value that specifies an optimizer confidence level that execution of a generated query plan for the query will incur a processing cost that will not exceed an estimated processing cost, generates a first query plan in accordance with the confidence threshold parameter, calculate an estimated processing cost of the first query plan that specifies an estimated processing performance characteristic for execution of the first query plan, determine whether the estimated processing cost is less than or equal to the service level goal; and lower the confidence threshold parameter to a second value when the determining determines that the estimated processing cost is not less than or equal to the service level goal;

determines whether the second value of the confidence threshold parameter is less than a threshold boundary value; and generates a second query plan in accordance with the second value of the confidence threshold parameter when the determining the second value is not less than the threshold boundary value.

10. The system of claim 9, wherein the at least one processor is further configured to determine the estimated processing cost is less than or equal to the service level goal, and wherein the processing module executes the first query plan.

11. The system of claim 9, wherein the at least one processor is further configured to determine the second value is less than the threshold boundary value and, responsive thereto, executes the first query plan.

12. The system of claim 9, wherein the service level goal specifies a desired maximum processing duration of the query.

* * * * *